Figure 3:
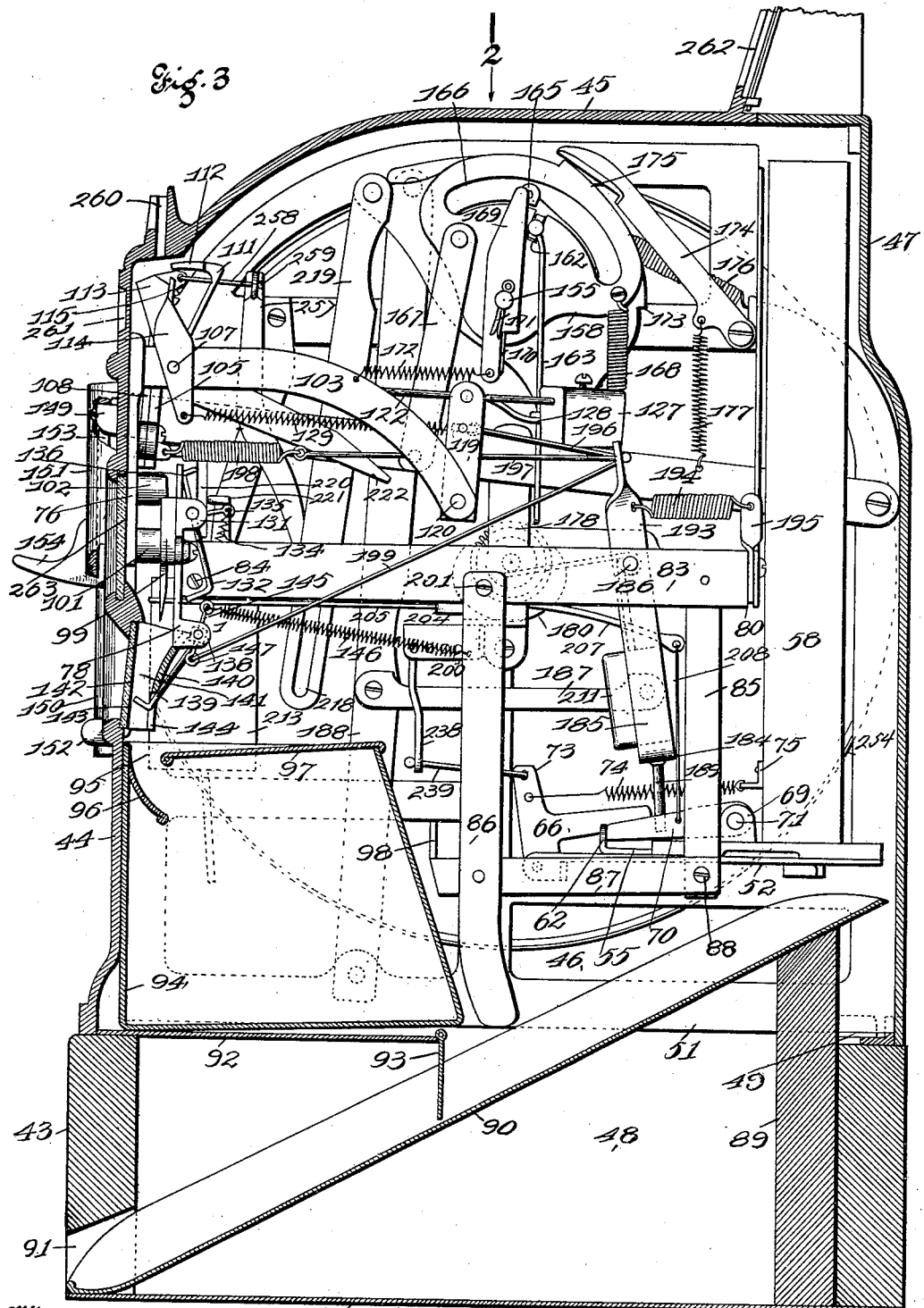

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 1.
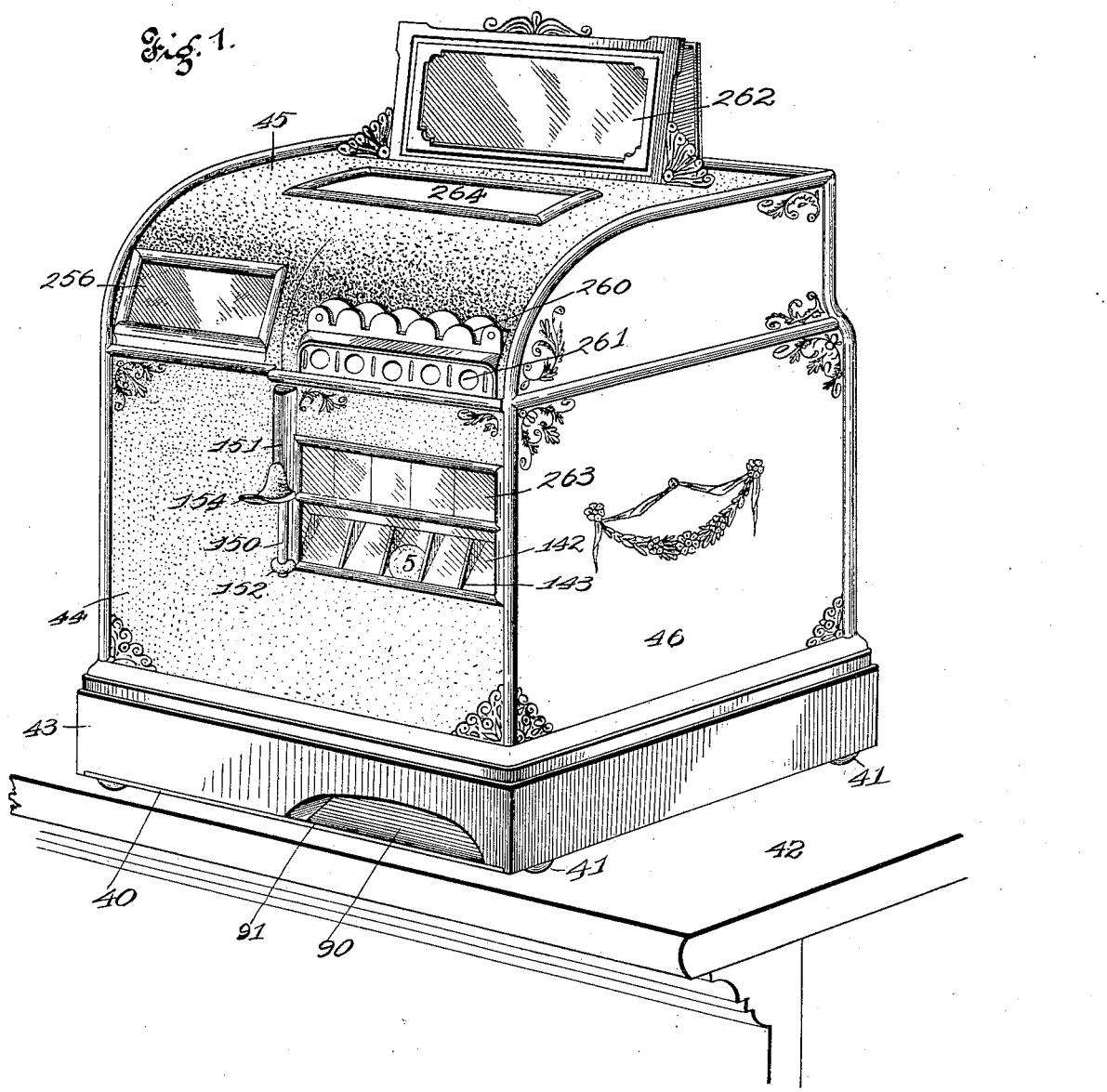

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 2.
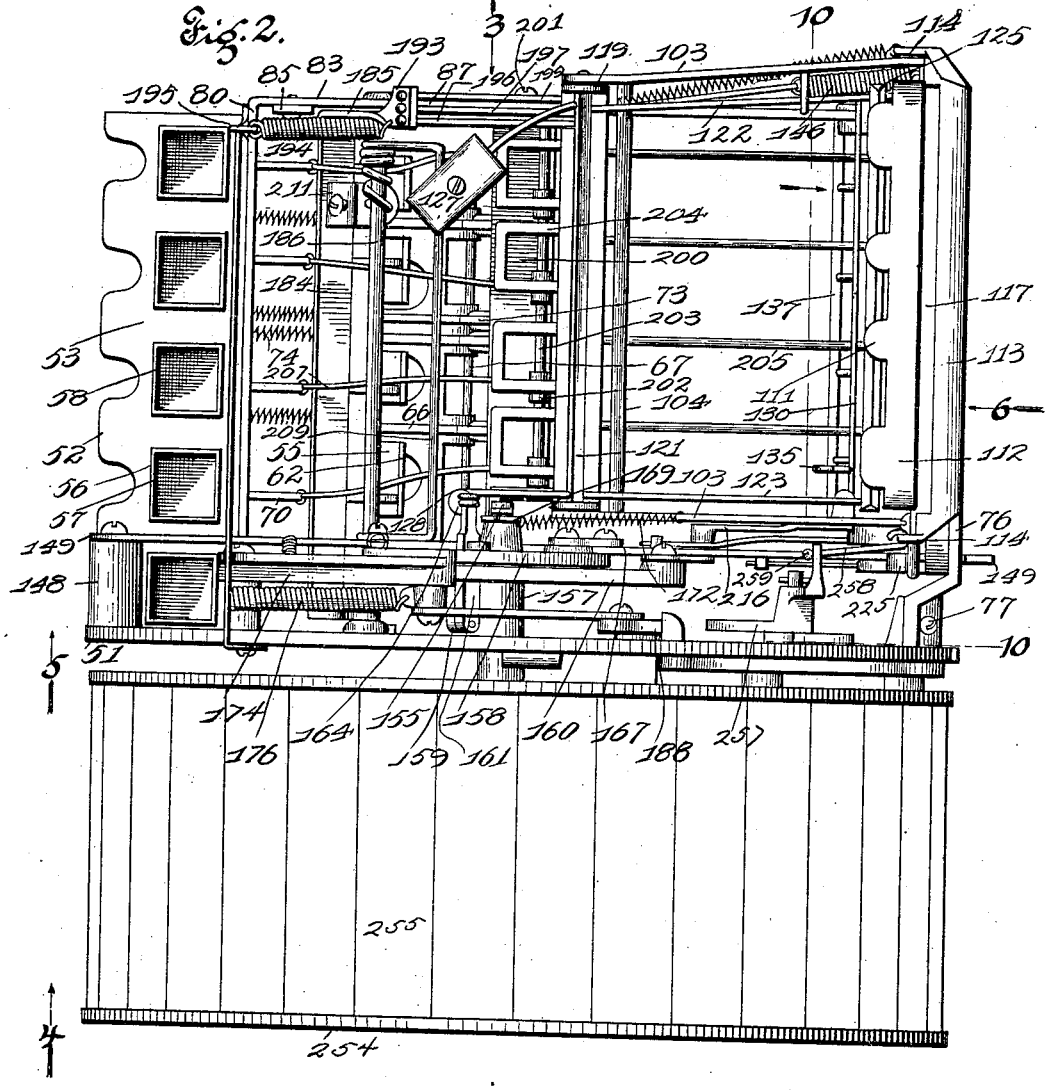
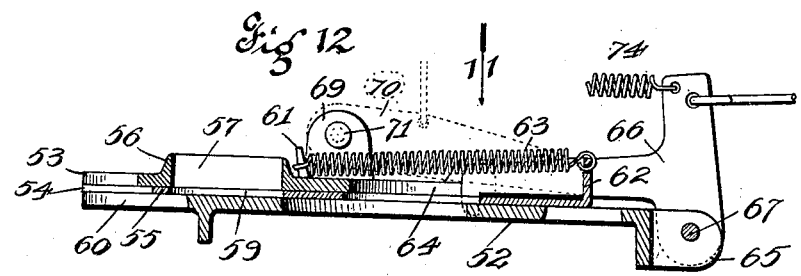
Witnesses
Alfred A. Eicks
M. Snion
Inventor
Gustav F. Hochriem
by Higdon & Longan & Hopkins attys.

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 3.

Witnesses
Alfred A. Evins
W. G. Irion

Inventor
Gustav F. Hochriem
by Higdon, Longan & Hopkins attys.

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 4.
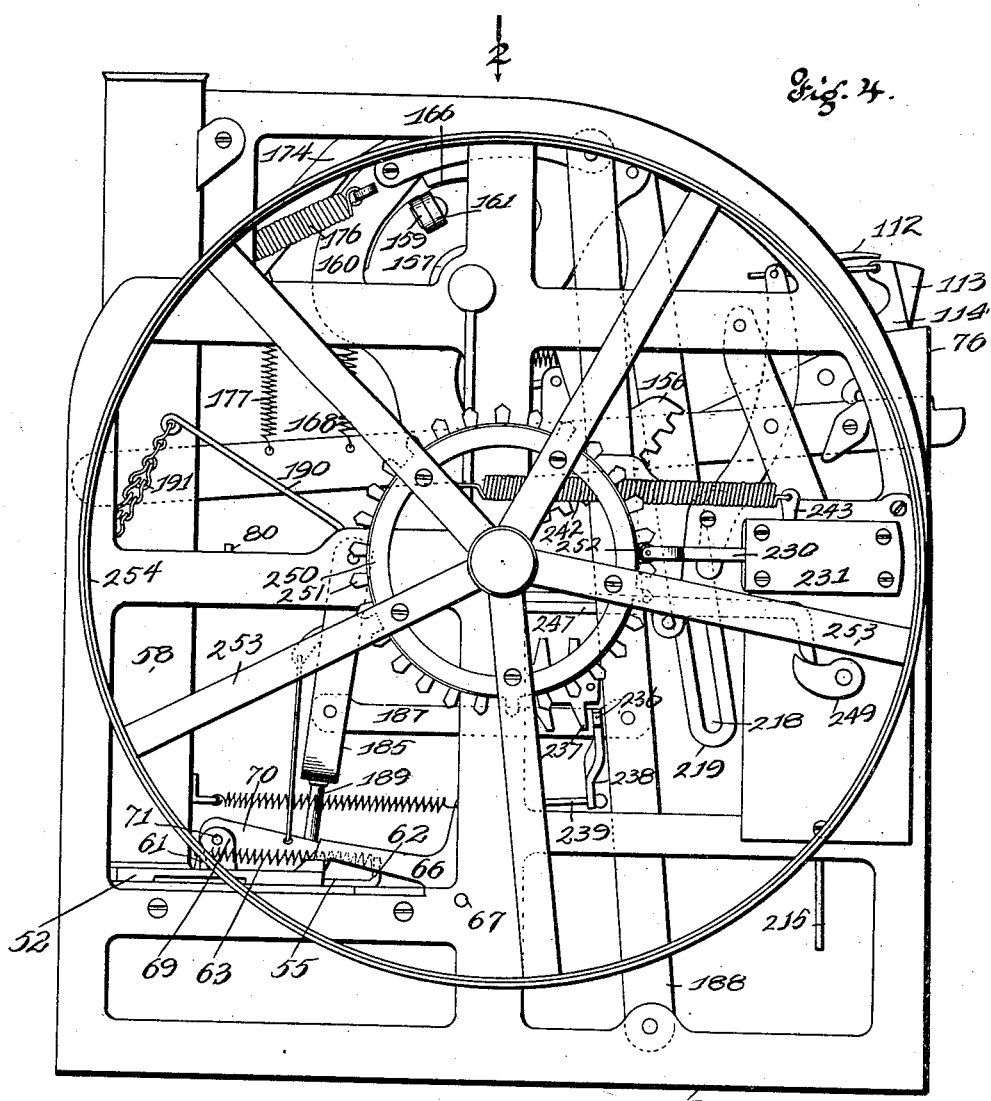
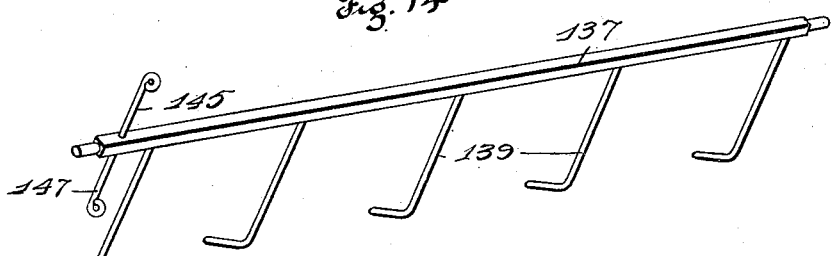

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 5.

Witnesses
Alfred Eiers
M. S. Suir

Inventor
Gustav F. Hochriem
by Higdon & Longan & Hopkins attys.

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 6.
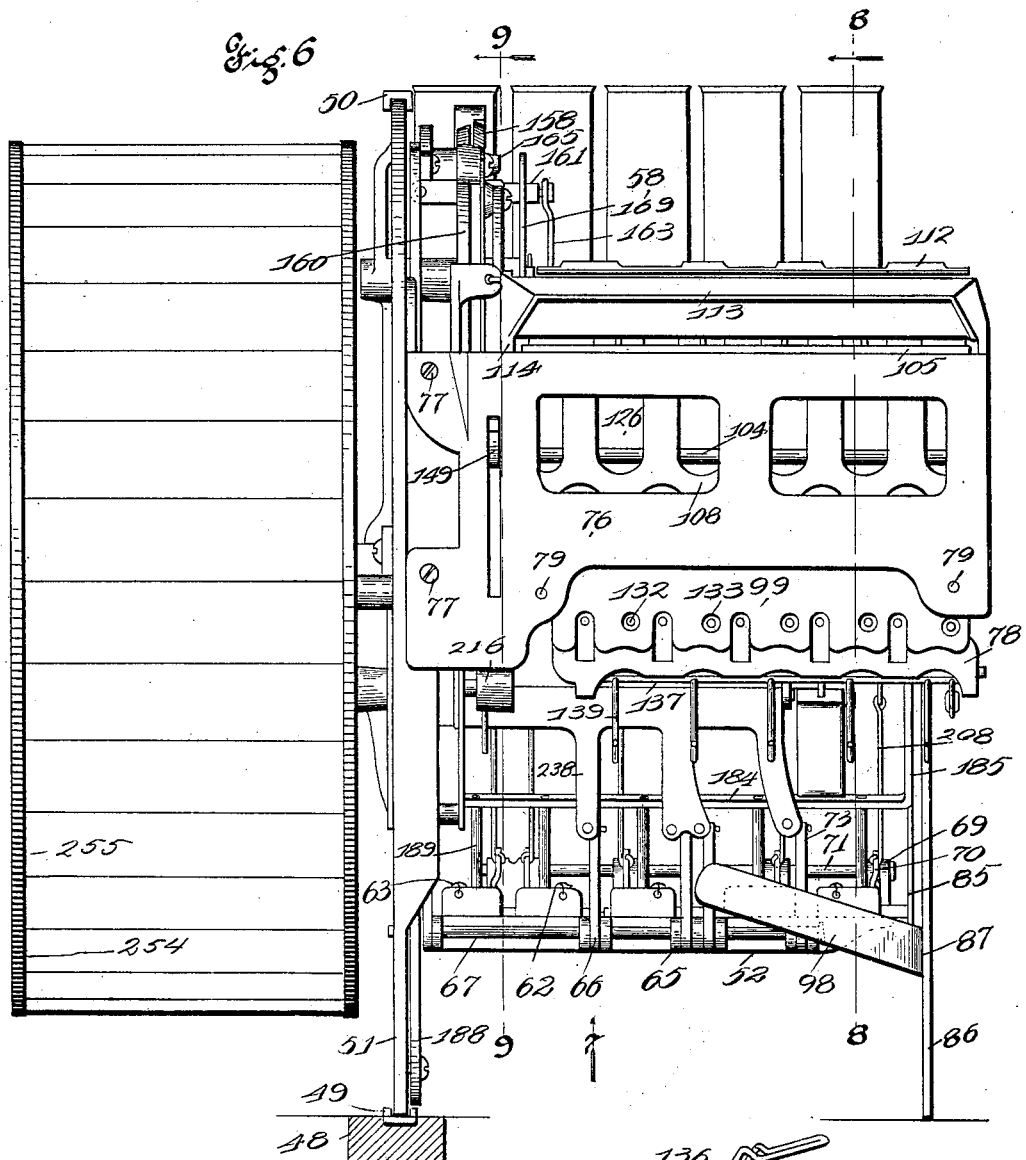
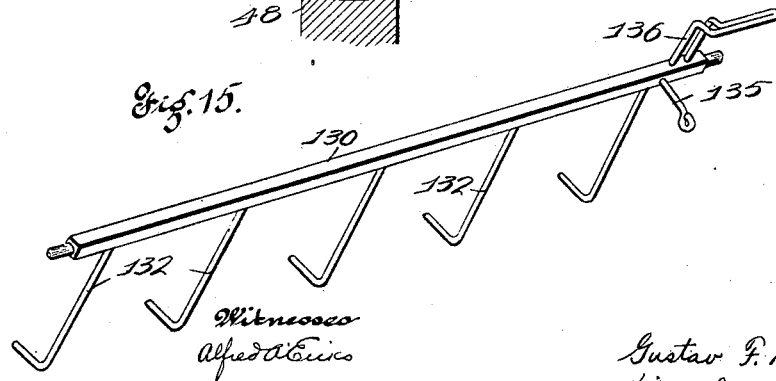

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 7.
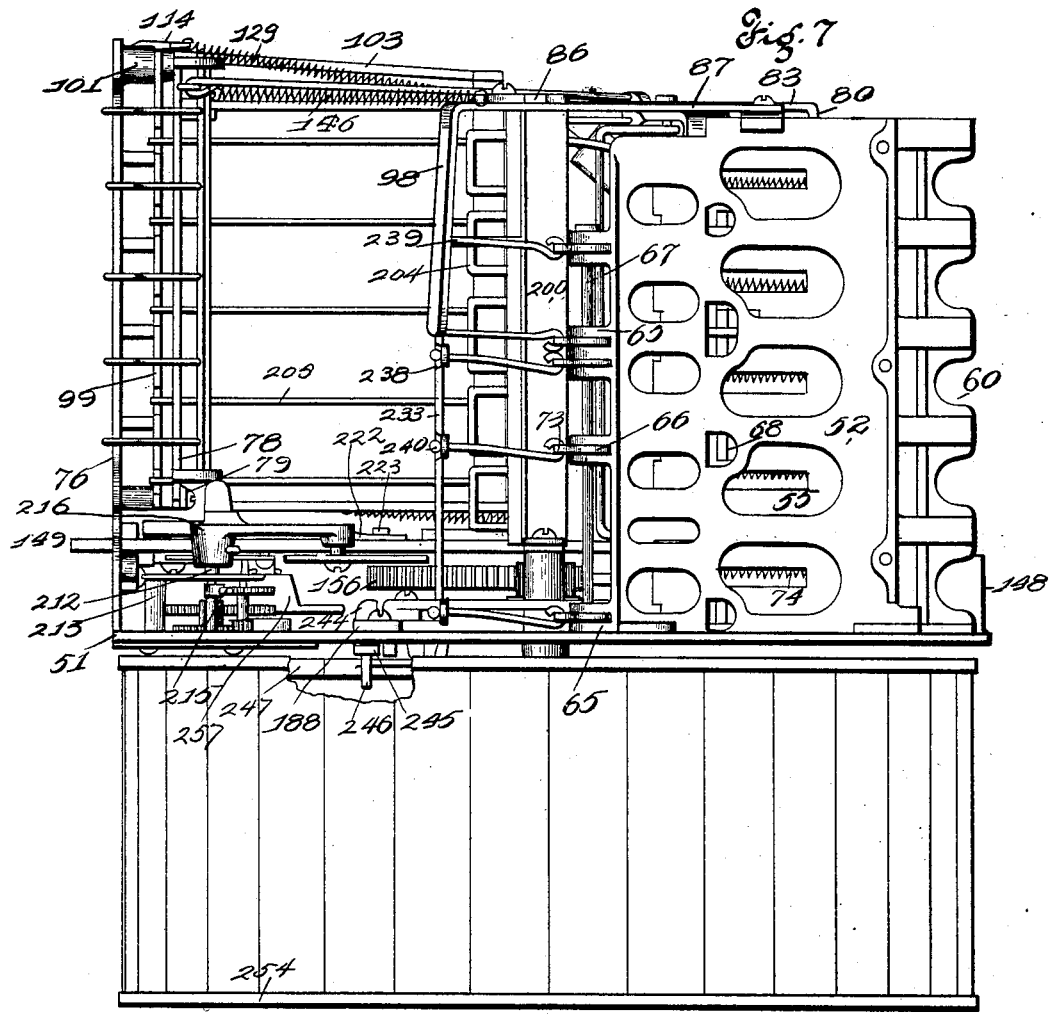
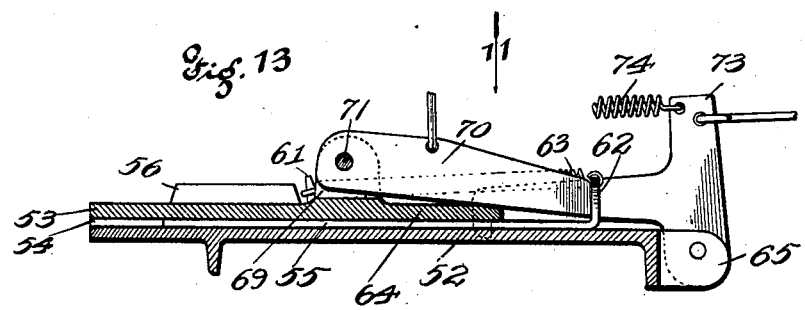

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 8.

Witnesses
Alfred A. Ricks
M. S. Dion

Inventor
Gustav F. Hochriem
by Higdon, Longan & Hopkins, Attys.

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 9.
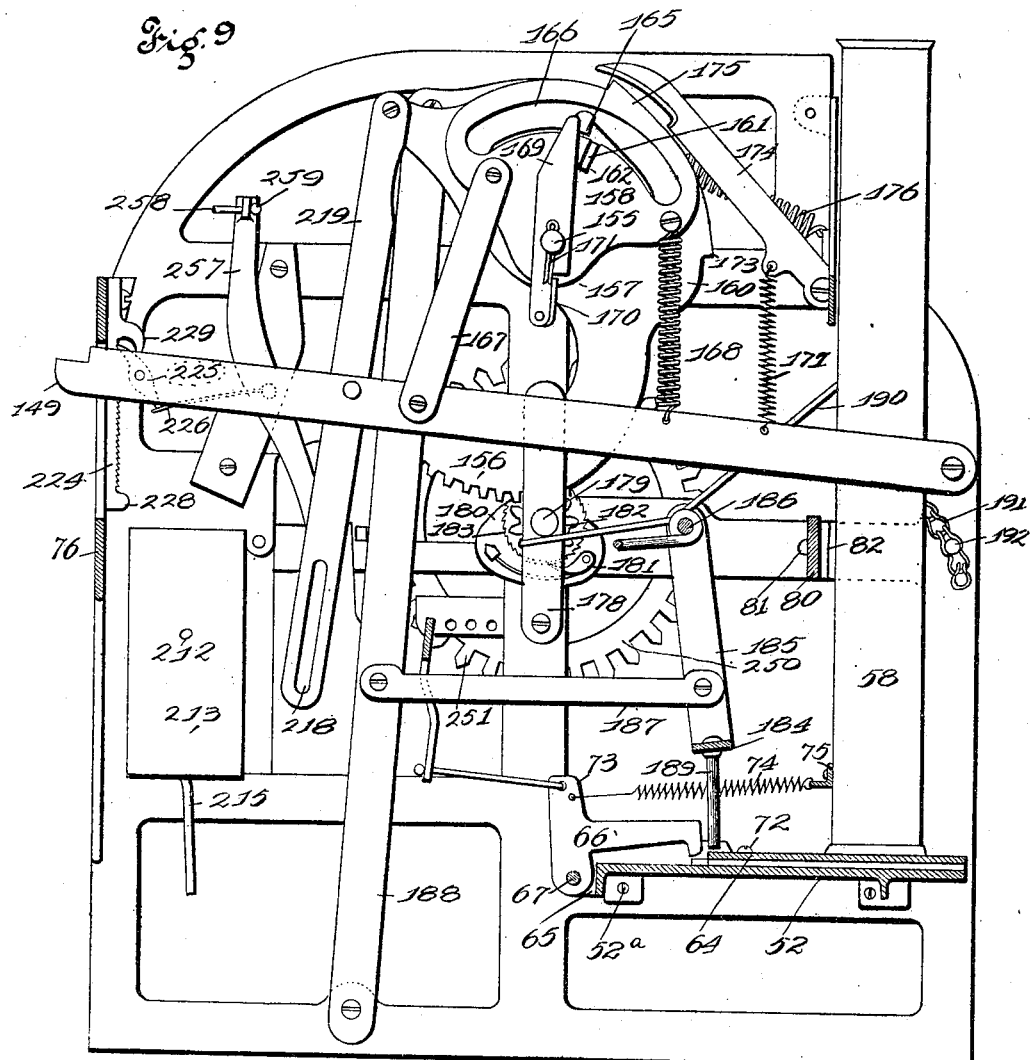
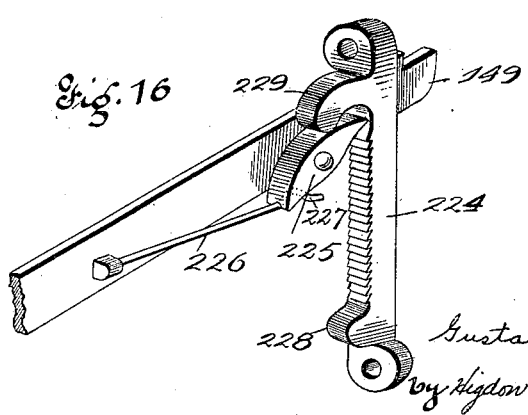

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 10.
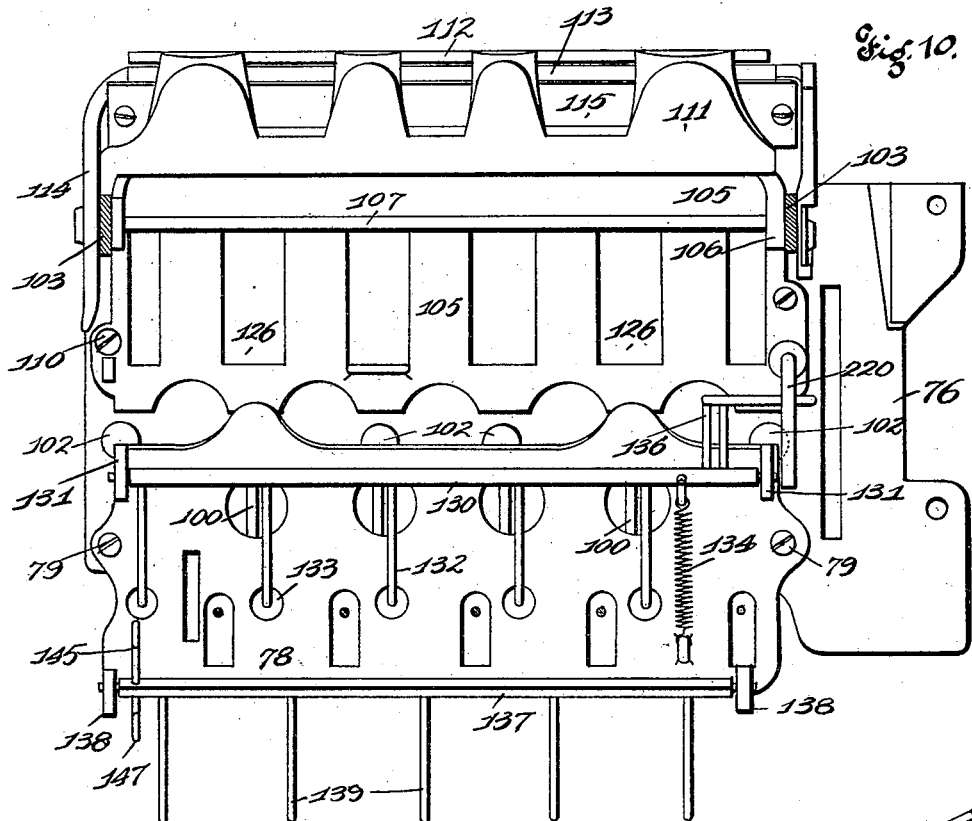
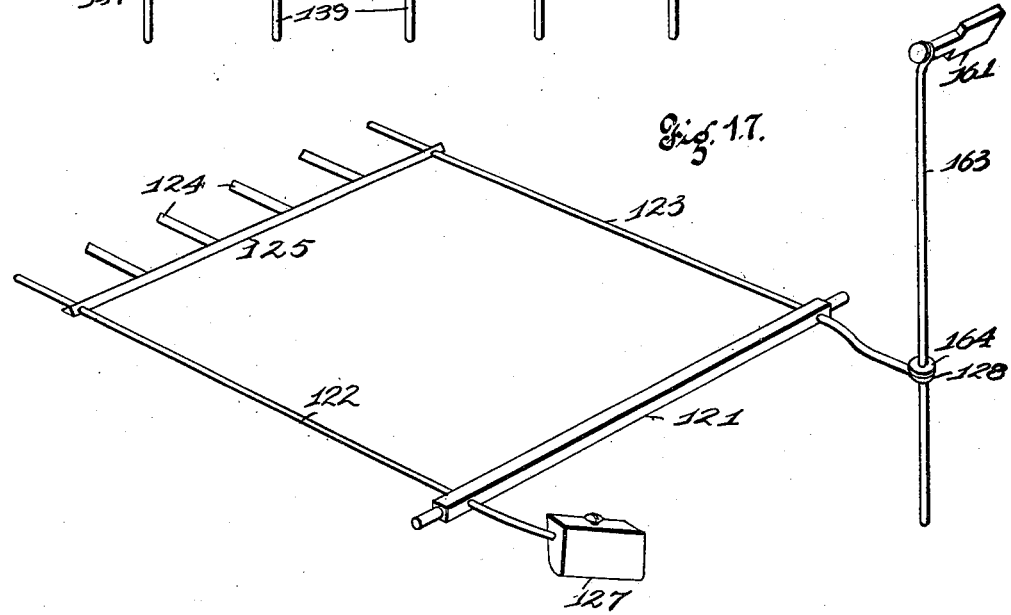

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 11.
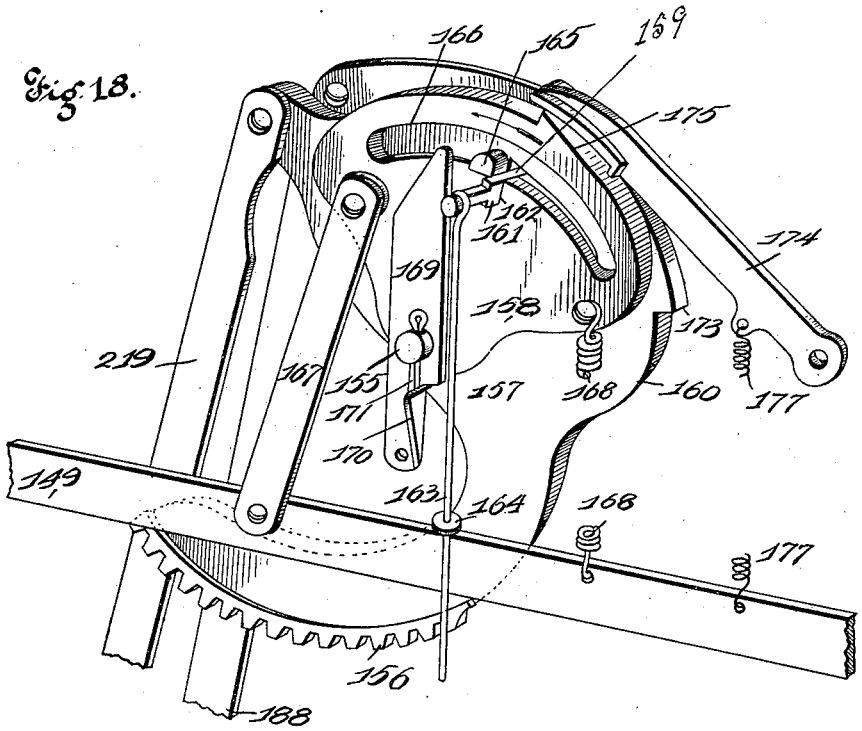
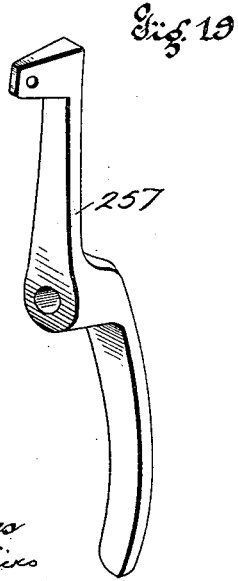
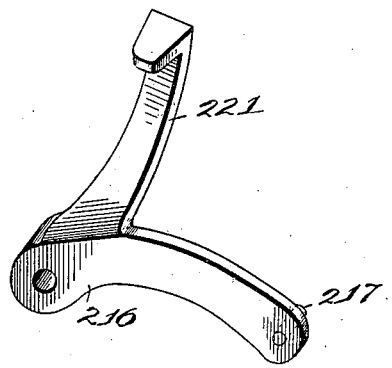
Witnesses
Inventor
Gustav F. Hochriem
by Higdon Longan & Hopkins attys.

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 12.
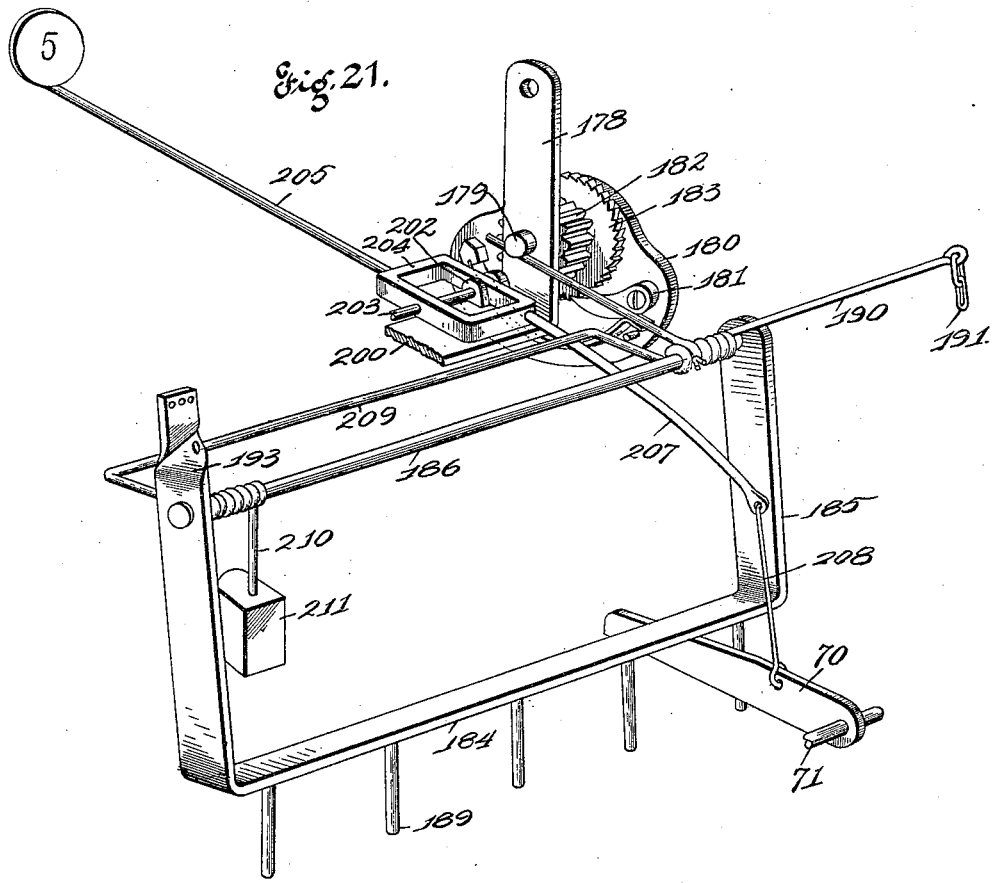
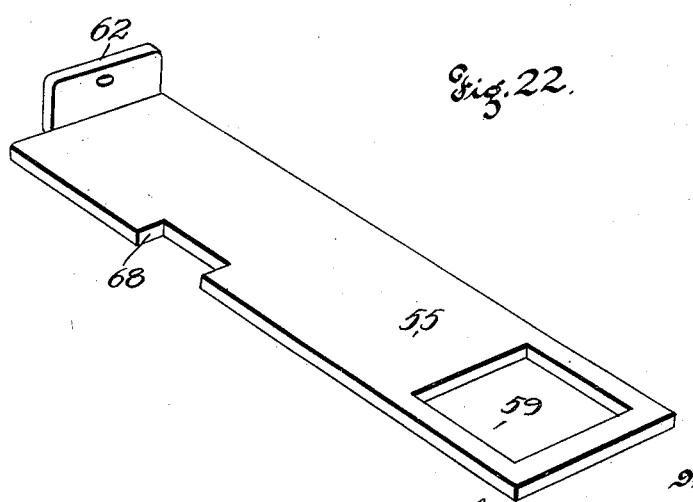

No. 763,286. PATENTED JUNE 21, 1904.
G. F. HOCHRIEM.
VENDING MACHINE.
APPLICATION FILED FEB. 4, 1904.
NO MODEL. 13 SHEETS—SHEET 13.
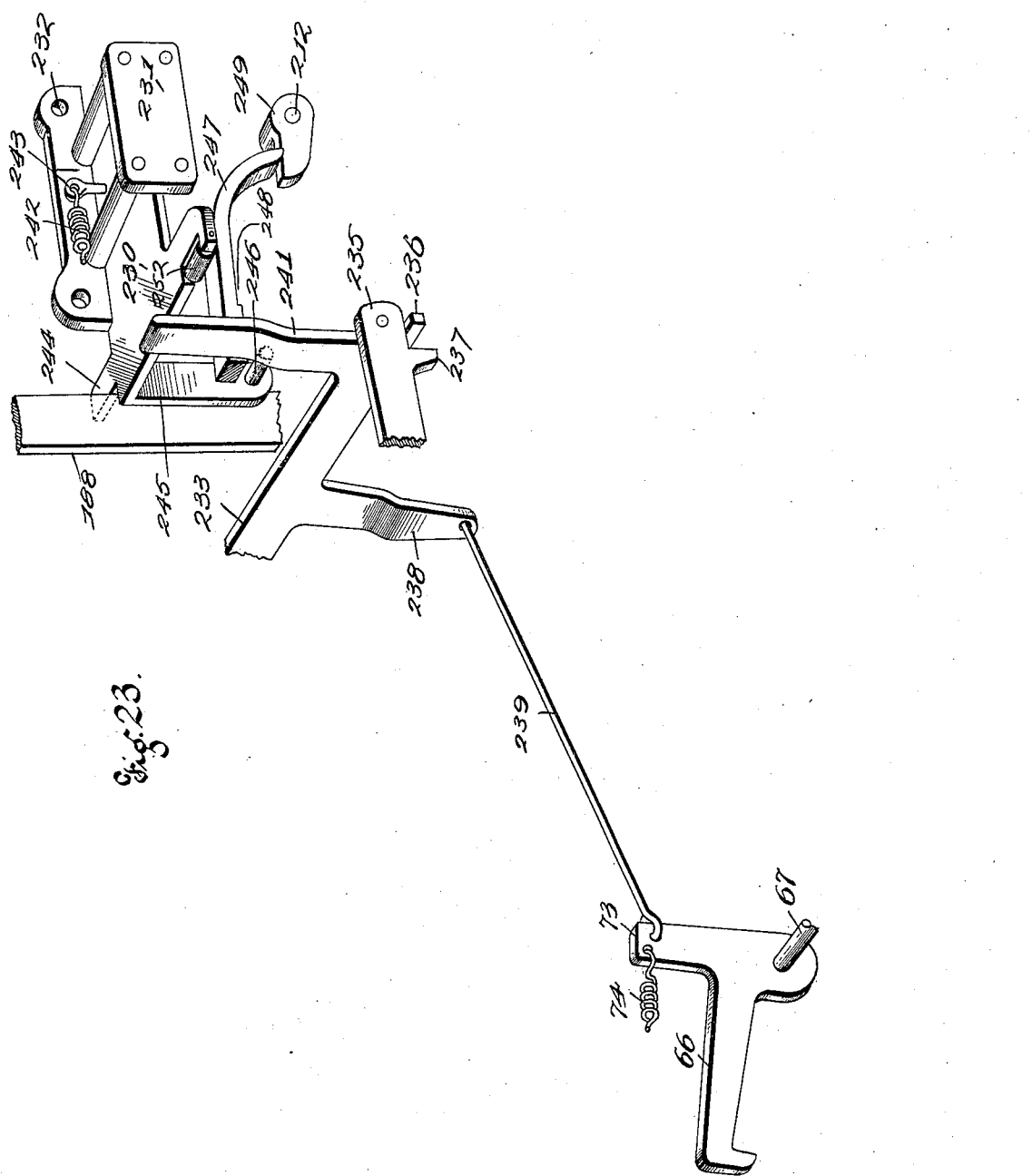

No. 763,286.

Patented June 21, 1904.

UNITED STATES PATENT OFFICE.

GUSTAV F. HOCHRIEM, OF ST. LOUIS, MISSOURI.

VENDING-MACHINE.

SPECIFICATION forming part of Letters Patent No. 763,286, dated June 21, 1904.

Application filed February 4, 1904. Serial No. 192,051. (No model.)

*To all whom it may concern:*

Be it known that I, GUSTAV F. HOCHRIEM, a citizen of the United States, residing at St. Louis, State of Missouri, have invented certain new and useful Improvements in Vending-Machines, of which the following is a specification containing a full, clear, and exact description, reference being had to the accompanying drawings, forming a part hereof.

My invention relates to vending-machines; and it consists of the novel features herein shown, described, and claimed.

Figure 5:
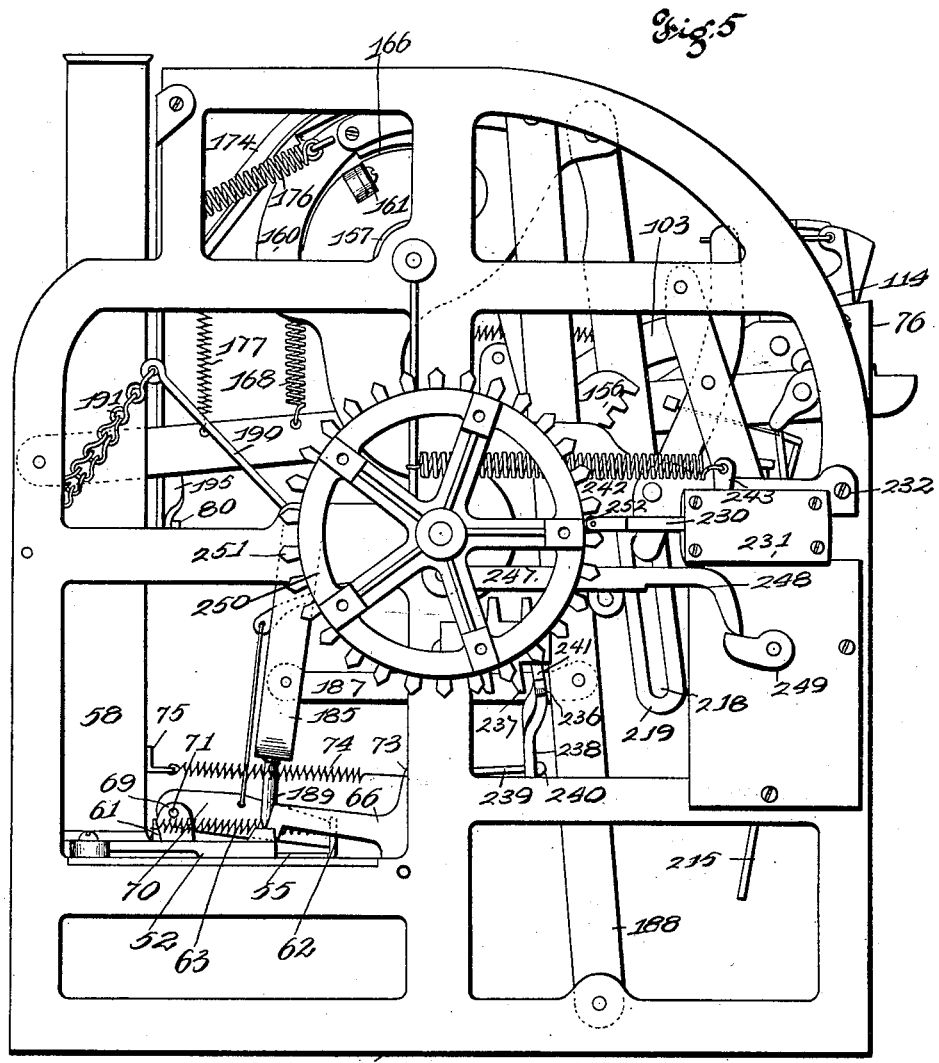
Figure 8:
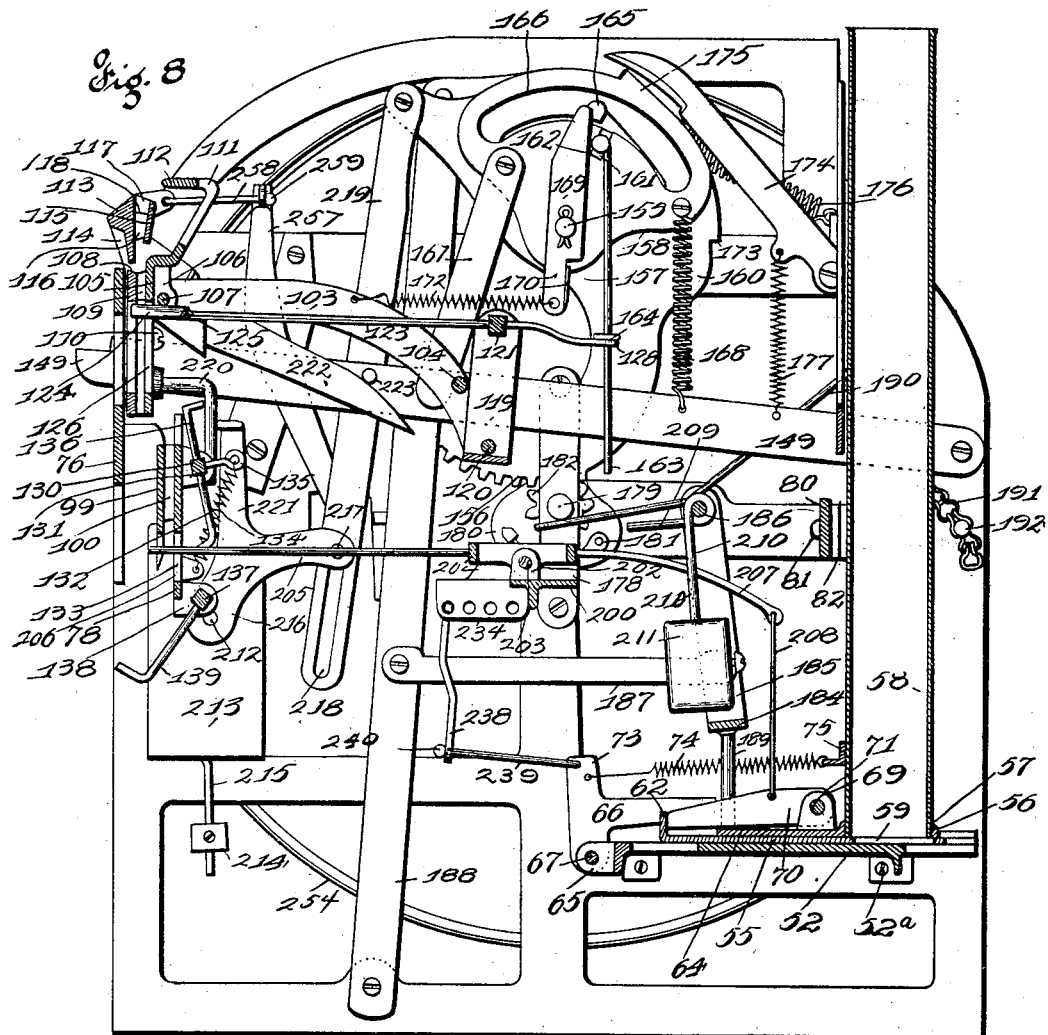
Figure 11:
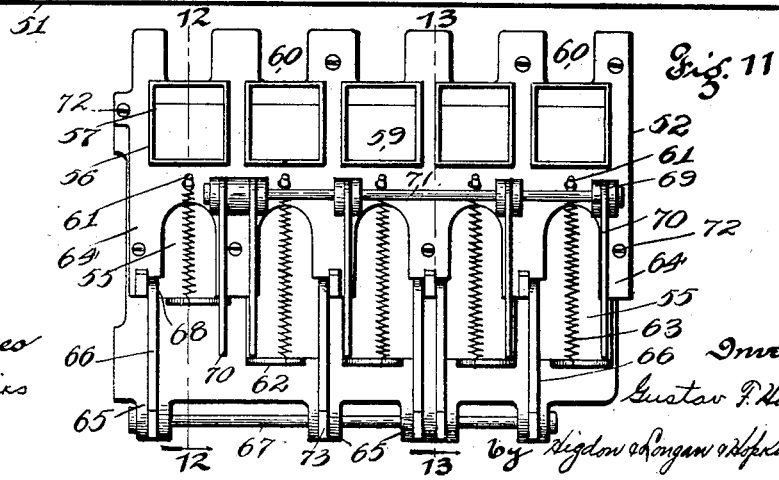

In the drawings, Figure 1 is a perspective of a vending-machine constructed in accordance with the principles of my invention. Fig. 2 is a top plan view of the mechanism with the casing removed and looking in the direction indicated by the arrow 2 in Figs. 3 and 4. Fig. 3 is a side elevation of the mechanism, the casing being shown in section, and taken looking in the direction indicated by the arrow 3 in Fig. 2. Fig. 4 is a side elevation looking in the direction indicated by the arrow 4 in Fig. 2. Fig. 5 is a view analogous to Fig. 4, with the indicating-wheel removed, and taken looking in the direction indicated by the arrow 5 in Fig. 2. Fig. 6 is a front elevation looking in the direction indicated by the arrow 6 in Fig. 2. Fig. 7 is a bottom plan view taken looking in the direction indicated by the arrow 7 in Fig. 6. Fig. 8 is a vertical cross-section on a plane parallel with Fig. 3 and taken on the line 8 8 of Fig. 6 and looking in the direction indicated by the arrow. Fig. 9 is a vertical cross-section on a plane parallel with Fig. 8 and on the line 9 9 of Fig. 6. Fig. 10 is a vertical longitudinal section on the line 10 10 of Fig. 2 looking in the direction indicated by the arrow. Fig. 11 is a detail plan view of the delivery mechanism looking in the direction indicated by the arrow in Figs. 12 and 13. Fig. 12 is a vertical section on the line 12 12 of Fig. 11 and looking in the direction indicated by the arrow. Fig. 13 is a vertical section on the line 13 13 of Fig. 11 and looking in the direction indicated by the arrow. Fig. 14 is a perspective of the coin-detector dogs. Fig. 15 is a perspective of the coin-releasing-dog bar. Fig. 16 is a detail perspective of the rack and reversible pawl controlling the operation of the main operating-lever. Fig. 17 is a perspective of the coin-operated lever which starts the machine. Fig. 18 is a detail perspective, upon an enlarged scale, of the clutch mechanism affected by the coin-operated lever. Fig. 19 is an enlarged perspective of the lever connecting the clutch to the swinging jaw. Fig. 20 is an enlarged perspective of the clock-winding lever. Fig. 21 is an enlarged perspective detail of one of the coin-operated levers for unlocking the delivery-slides. Fig. 22 is an enlarged detail perspective of one of the delivery-slides. Fig. 23 is a detail perspective of one of the trains of mechanism for releasing the delivery-slides to pay out commodities.

Referring to the drawings in detail, the sheet-metal bottom 40 rests upon rubber cushions 41, and said rubber cushions rest upon the table 42. The frame is substantially square in plan, and the base consists of wooden sills 43, resting upon the bottom 40 and framed together to form a square.

The casing comprises the front 44, the top 45, the ends 46, and a removable back 47, said casing resting upon the upper edges of the sills 43. An intermediate cross-sill 48 connects the front and back sills, and a channel-bar 49 is mounted upon this cross-sill. Flanges extend downwardly from the top 45 to form an inverted channel-bar 50 in vertical alinement with the channel-bar 49, and the supporting-frame 51 is slidingly mounted in the channel-bars 49 and 50, so that the frame and all its connections may be withdrawn from the casing by removing the back section 47.

A delivery-base 52 is secured to the supporting-frame 51 by the screws 52$^a$.

The perforated plate 53 has parallel ribs 54 on its lower face engaging the upper face of the base 52, and the delivery-slides 55 are mounted between the ribs 54. Flanges 56 extend upwardly from the plate 53 around the openings 57, and the lower ends of the commodity-receptacles 58 are fixed in said openings 57. A quantity of commodities may be placed in each of the receptacles 58, said commodities passing downwardly one at a time into the openings 59 in the delivery-slide, and as the slide is pushed backwardly the commodity will fall through one of the openings 60 in the delivery-base 52. Posts 61 extend upwardly from the plate 53, and the arms 62 extend upwardly from the rear ends of the slides 55, the retractile coil-springs 63 connecting the arms 62 to the posts 61, the tension of said springs being exerted to throw the slides backwardly and discharge the commodities.

Fingers 64 extend forwardly from the plate 53 and form stops against which the arms 62 strike to limit the backward motion of the slides 55. A series of ears 65 extends forwardly from the base 52, and the latching-dogs 66 are pivoted to said ears by the pin 67, the free ends of said dogs extending backwardly and downwardly and engaging in notches 68 in the slides 55 to hold the slides forwardly against the tension of the springs 63. A series of ears 69 extends upwardly from the center of the base 52 in transverse alinement, and the locking-dogs 70 are pivotally connected to said ears by the pin 71, the free ends of said dogs normally engaging the arms 62 to lock the slides in their forward position until the coin-operated mechanism raises the locking-dogs to release the slides.

The plate 53 is secured to the base by the screws 72. Arms 73 extend upwardly from the latching-dogs 66, and the retractile coil-springs 74 connect said arms to the angle-iron 75, said angle-iron being secured to the commodity-tubes 58, the tension of said springs being exerted to throw the latching-dogs 66 downwardly into the notches 68.

A coin-chute-supporting plate 76 is secured to the frame 51 by screws 77, and the coin-chute lower back plate 78 is secured to the supporting-plate by screws 79. The back brace 80 is located in front of the commodity-tubes and secured to the frame 51 by the screw 81, passing through the back brace and through the lug 82, which extends from the frame. The side bar 83 extends forwardly from the outer end of the back brace 80 and is secured to the coin-chute lower back plate 78 by the screw 84, inserted through the forward end of said side bar and through the lug projecting from said back plate.

A brace 85 connects the rear end of the side bar 83 to the outer end of the base 52. The leg 86 is connected to the side bar 83 near its center and extends downwardly to a level with the lower edge of the frame 51, said leg being used to support the mechanism when out of the casing. A brace 87 connects the lower part of the leg 86 to the lower end of the brace 85 and to the outer end of the base 52 by the screw 88. A board 89 is mounted inside of the back wooden sill 43, and the commodity-chute 90 is mounted with its rear end upon the upper edge of the board 89 and its forward end terminating in the delivery-opening 91 in the lower part of the front wooden sill 43, said chute being upon an incline.

A sheet-metal floor 92 is mounted upon the front and side sills 43 above the forward half of the commodity-chute 90, and a gravity-door 93 swingingly depends from the rear edge of the floor 92, said door being of such length that when swung backwardly it will strike the bottom of the chute 90. A coin-box 94 is mounted upon the floor 92 and has coin-receiving openings 95 just inside of its front wall, there being a deflector 96 below said openings to throw the coins backwardly into the box. The lid 97 is pivoted in place to form the top of the box and to provide means for removing the coins. The arm 98 extends laterally from the forward end of the brace 87 to engage the rear side of the coin-box 94 and hold it within bounds.

The coin-chute lower front plate 99 is interposed between the back plate 78 and the supporting-plate 76, there being ribs 100 extending backwardly from the plate 99 against the plate 78 to divide the coin-chute vertically, there being just space enough between said ribs to allow the passage of a coin. This lower part of the coin-chute is rigidly mounted, while the upper part of the coin-chute is pivotally mounted.

The spacing-blocks 101 extend backwardly from the lower corners of the coin-chute-supporting plate 76 to locate the lower part of the coin-chute some distance back of the supporting-plate. The guide-blocks 102 extend backwardly from the supporting-plate 76 in vertical alinement with the ribs 100. The supporting-plate arms 103 extend backwardly and downwardly from the upper corners of the supporting-plate 76, the rear ends of said arms being connected by the stop-bar 104. The rear upper coin-chute plate 105 has ears 106, through which the pivot 107 extends to pivotally connect said ears to the arms 103. The front upper coin-chute plate 108 is placed against the spacing-ribs 109, which extend forwardly from the plate 105, and the screws 110 connect the plates 105 and 108 together to form the upper part of the coin-chute, which swings upon the pivot 107. Arms 111 extend upwardly and backwardly from the plate 105, and the rigid coin-chute jaw 112 extends horizontally forwardly from the upper ends of said arms. The swinging coin-chute jaw 113 has arms 114, through which the pivot 107 extends, the upper edge of said jaw 113 passing under the jaw 112. A guide-plate 115 is secured to lugs 116, extending backwardly from the ends of the jaw 113, so as to form the coin-chute mouth 117, and lugs 118 divide the coin-chute mouth transversely into spaces approximately the right size to receive the coins. A yoke 119 is pivotally mounted upon the rod 120, connecting the rear ends of the arms 103, the arms of said yoke extending upwardly and the forward motion of said arms being limited by the stop-bar 104. A coin-operated pivot-bar 121 has its ends loosely mounted in the upper ends of the arms of the yoke 119, and the operating-levers 122 and 123 extend through the ends of this bar 121. The coin-fingers 124 extend forwardly from the bar 125, and said bar 125 connects the forward ends of the levers 122 and 123, and said fingers 124 extend through vertical slots 126 in the upper coin-chute plates 105 and 108. A counterbalancing-weight 127 is fixed upon the rear end of the lever 122, and a vertical bearing 128 is formed at the rear end of the lever 123. The counterbalancing-weight 127 overbalances the fingers 124 to hold them normally elevated to the upper limits of the slots 126; but when one or more coins are inserted into the coin-chute the weight 127 will be overcome by the weight of the coins. A retractile coil-spring 129 connects the lower end of one of the arms 114 to the upper end of one of the arms of the yoke 119, the tension of said spring being exerted to hold the swinging coin-chute jaw 113 to its outer limit of motion and the tension of said spring being also exerted to hold the yoke-arms against the stop-bar 104 and hold the fingers 124 in the slots 126 in position to catch and hold the coins. The coin-releasing dog-bar 130 is pivotally mounted in ears 131, extending backwardly from the coin-chute lower back plate 78, and the coin-releasing dogs 132 extend from said bar 130 downwardly and forwardly through the openings 133 in the plates 78 and 99, said dogs being located in position between the ribs 100 to catch and hold the coins as they pass downwardly from the coin-chute mouth. A retractile coil-spring 134 connects the arm 135, extending backwardly from the bar 130 to the lower part of the plate 78, the tension of said spring being exerted to hold the dogs 132 in position to catch the coins. An operating-arm 136 extends upwardly and laterally from the bar 130 to be engaged by other operating mechanism to overcome the spring 134 and withdraw the dogs 132 to release the coins. The coin-detector dog-bar 137 is pivotally mounted in ears 138, extending from the lower corners of the plate 78, and the coin-detector dogs 139 extend downwardly and forwardly below the lower coin-chute plates 78 and 99. An inclined wall 140 has ribs 141 projecting forwardly, and a glass plate 142 is placed against the front edges of the ribs 141 to form the coin-displaying hoppers 143, located in position to receive the coins as they pass from the lower coin-chute, and the coin-detector dogs 139 swing backwardly and forwardly in slots 144, formed from the lower edge of the inclined wall 140, between the ribs 141, so as to catch the coins and hold them in position to be seen through the glass 142. An arm 145 extends upwardly from the bar 137, and a retractile coil-spring 146 connects said arm to the leg 86, the tension of said spring being exerted to throw the dogs 139 forwardly to catch the coins.

An arm 147 extends downwardly from the bar 137, said arm being connected to a moving part of the mechanism, as hereinafter described, for the purpose of withdrawing the dogs 139 and allowing the coins to pass into the coin-box 94. A spacing-block 148 extends laterally from the rear part of the frame 51, and the main operating-lever 149 is pivotally connected to the outer end of said spacing-block, said lever extending horizontally forwardly to a point beyond the front edge of the frame 51. A sliding bolt 150 is mounted in bearings 151 and 152, extending forwardly from the casing-front 44, and said bolt has a slot 153 to receive the forward end of the lever 149. A handle 154 projects forwardly from the bolt to be manually engaged for operating the lever. A stud 155 extends laterally from the central upper part of the frame 51 in vertical alinement with the lever 149.

A segmental gear 156 has a hub 157 pivotally mounted upon the stud 155, and a clutch member 158 is mounted upon the stud 155 beside the hub 157. A clutch-dog arm 159 extends from the clutch member 158 through a slot in the clutch member 160, said clutch member 160 being carried by the hub 157, and the clutch-dog 161 is pivotally connected to the outer end of the clutch-dog arm 159 and extends beside said arm through the clutch members 158 and 160 and to a point on the opposite side of said members from the pivot, said clutch-dog operating in a substantially vertical slot 162 in the clutch member 158. A connecting-rod 163 extends downwardly from the free end of the clutch-dog through the vertical bearing 128, and a stop 164, fixed upon said connecting-rod 163, limits the downward motion of said rod through the bearing 128.

When the coins strike the fingers 124, said fingers are depressed, thus elevating the bearing 128 against the stop 164 and raising the connecting-rod 163, thereby raising the clutch-dog 161. A clutch-tooth 165 extends from the clutch member 160 through the slot 166 of the clutch member 158 to be engaged by the clutch-dog 161 when said clutch-dog is swung upwardly by the weight of the coins, thereby locking the clutch member 160 to the clutch member 158 when said member is being moved in the direction indicated by the arrow in Fig. 18.

A connecting-rod 167 connects the forward end of the clutch member 158 to the lever 149, so that when said lever 149 is depressed the clutch member 158 is operated forwardly, as indicated, and if a coin is in the chute upon the fingers 124 the clutch member 160 will be carried forwardly and the segmental gear 156 will be correspondingly moved. A retractile coil-spring 168 connects the rear end of the clutch member 158 to the operating-lever 149, the tension of said spring being exerted to pull the clutch member and the lever toward each other, thereby elevating the lever and returning the clutch member to its normal position, as shown in Fig. 9. A brake-bar 169 is pivotally mounted upon the stud 155 inside of the clutch member 158 in position to engage the clutch-dog 161 when the clutch is operated. A stop 170 extends laterally from the lower end of the brake-bar, and the spring-cotter 171, rigidly mounted by being inserted through the stud 155, extends downwardly in front of the stop 170, so that the backward motion of the upper end of the brake-bar is limited, thereby releasing the clutch-dog 161 from the pressure of the brake when the clutch mechanism is in its normal position, so that said brake will not interfere with the operation of the clutch-dog by the weight of the coin.

The retractile coil-spring 172 connects the lower end of the brake-bar 169 to one of the arms 103, the tension of said spring being exerted to hold the brake-bar against the clutch-dog after the lever 169 has commenced to operate the clutch mechanism. A ratchet-tooth 173 projects backwardly from the clutch member 160. A pawl 174 is pivotally connected to the frame 51 in position to engage the tooth 173 at the forward end of the motion of the clutch mechanism, and a cam-surface 175 extends from the clutch member 158 to engage the pawl 174 and throw said pawl out of engagement with the tooth 173 when the clutch member 158 moves backwardly and returns to its normal position, thus releasing the clutch member 160 and allowing it to return to its normal position after the return of the clutch member 158. A retractile coil-spring 176 connects the clutch member 160 to the frame, the tension of said spring being exerted to return the clutch mechanism to its normal position. A spring 177 connects the pawl 174 to the operating-lever 149, the tension of said spring being exerted to hold the pawl against the clutch members. A bearing-block 178 has its ends attached to the frame 51, and a shaft 179 is rotatably mounted through the frame and through the bearing-block. A hub 180, carrying the spring-actuated pawl 181, is fixed upon the shaft 179 just inside the frame 51, and the spur-gear 182 is loosely mounted just inside the bearing-block 178, in mesh with the segmental gear 156. A ratchet-wheel 183 is mounted between the gear 182 and the hub 180, rigidly connected to the gear in position to be engaged by the pawl 181. When the clutch mechanism is moved forwardly by pressing the lever 149, the ratchet-wheel 183 slides over the pawl 181 and the shaft 179 remains stationary; but when the clutch mechanism returns to its normal position the reverse motion of the segmental gear causes the ratchet-wheel to engage the pawl and rotate the shaft. The delivery-slide-connecting bar 184 is mounted horizontally above the delivery-slides and has arms 185 extending upwardly from its ends and connected to the frame by the pivot-rod 186, extending through the side bar 83 and through the frame.

A horizontal connecting-rod 187 extends forwardly from the lower part of one of the arms 185 and is attached to the vertical connecting-rod 188, which connects the forward end of the clutch member 160 to the lower part of the frame, so that as the clutch member swings to and fro the bar 184 swings back and forth. The delivery-slide-unlocking fingers 189 extend downwardly from the bar 184 in front of the arms 62, so that when the slides have moved backwardly to discharge from the commodity-tubes 58 the operation of the clutch mechanism swings the bar 184 forwardly, causing the fingers 189 to engage the arms 62 and move the slides forwardly.

A brake-wire 190 is coiled to form a bearing, said bearing being mounted upon the pivot-rod 186, with one end of the wire engaging the shaft 179 and the other end of the wire extending backwardly and upwardly, and a chain 191 is attached to the rear end of the wire and removably engages a pin 192, extending from the rear part of the frame, so that by tightening the chain the tension of the brake-wire 190 increases the friction between the wire and the shaft 179 and retards the rotation of said shaft by the force of momentum. A coin-chute-operating arm 193 extends upwardly from the outer one of the arms 185, and a retractile coil-spring 194 connects this arm 193 to the arm 195, extending upwardly from the frame, the tension of said spring being exerted to pull the arm 193 backwardly and throw the bar 184 forwardly.

A connecting-rod 196 connects the arm 193 to one of the arms of the yoke 119, so that as the arm 193 swings backwardly the arms of the yoke 119 swing backwardly on the rod 120, thus withdrawing the coin-fingers 124 from the slots 126 and allowing the coin to pass downwardly into the chute. A connecting-rod 197 and a spring 198 form a yielding connection between the upper end of the arm 193 and the lower end of the pivoted part of the coin-chute, the tension of said spring being exerted to swing the lower end of the upper part of the coin-chute backwardly into alinement with the lower part of the coin-chute. A connecting-rod 199 connects the upper end of the arm 193 with the arm 147, so that as the arm 193 swings backwardly the coin-detector dogs 139 are withdrawn from the slots 144 to allow the coin to pass into the coin-box 94.

A brace 200 is connected to the lower end of the bearing-block 178 and to the upper end of the leg 86 and the side bar 83 by the screw 201. Ears 202 extend upwardly from this brace, and a pivot-rod 203 is inserted through these ears, there being a pair of ears for each of the commodity-tubes 58.

A coin-operated-lever frame 204 is pivotally mounted upon the rod 203, one for each of the commodity-tubes, and the coin-operated levers 205 extend forwardly from these frames through the slots 206 in the lower ends of the coin-chute plates 78 and 99 and between the ribs 100, so that as the coin descends through the chute the weight of the coin strikes the lever 205 and depresses said lever.

The unlocking-arms 207 extend backwardly from the frames 204, and the rear ends of said arms are connected to the locking-dogs 70 by the connecting-rods 208, so that when the pressure of the delivery-slides is removed from the locking-dogs 70 the weight of the coin on the forward end of the lever 205 will overbalance the weight of the locking-dog and raise said dog out of the way of the arms 62. The coin is held in position upon the lever 205 by one of the releasing-dogs 132 until said dog is withdrawn and the coin allowed to pass.

A bar 209 has its ends bent backwardly and formed into bearings, said bearings being mounted upon the pivot-rod 186, and the extreme end of said rod extends downwardly from one of the bearings to form the weight-support 210, and the weight 211 is attached to the lower end of said support. The weight 211 holds the bar 209 in horizontal alinement with the pivot-rod 186 in position to just pass above the forward ends of the arms 207 when the machinery is in a vertical position. If an attempt should be made to tamper with the machine by tipping it backwardly, the weight 211 will press the bar 209 downwardly upon the arms 207, thus holding the locking-dogs 70 down upon the slides, thereby preventing the slides from delivering the commodity out of the tubes.

A clock-gear is mounted on the shaft 212 in the casing 213, said casing being secured to the front part of the frame 51. The speed of the clock-gear is controlled by the weight 214, adjustably mounted upon the rod 215, said rod being operated by the escapement of the clock-gear. The clock-winding arm 216 extends upwardly and backwardly from the shaft 212 and is connected to the clutch member 160 by the pin 217, rigidly fixed in the end of the arm 216 and extending through the slot 218 in the connecting-rod 219, the upper end of said connecting-rod being secured to the forward end of said clutch member, so that as the clutch member is operated the free end of the arm 216 is forced downwardly, thus winding the clock. The slot 218 allows the clutch member to fly back to its normal position and allows the winding member to move slowly back to its normal position, the backward motion of said winding member being caused by the tension of the spring and being regulated by the escapement mechanism.

An arm 220 extends backwardly and downwardly from the movable coin-chute plate 105, and an arm 221 extends upwardly from the shaft 212 and engages the arm 220, so that by the unwinding of the spring of the clock the arm 221 presses against the arm 220 to swing the upper part of the coin-chute on the pivot 107, throwing the upper part of the coin-chute out of alinement with the lower part. The spring safety-arm 222 is rigidly connected to one of the arms 114 and extends backwardly and slightly downwardly and engages the pin 223, projecting from the side of the lever 149, so that if an instrument is inserted in the mouth of the coin-chute and the lever 149 afterward depressed, as might occur in endeavoring to tamper with the machine, the spring-arm 222 will yield and slip over the end of the pin 223, thus throwing the machine out of order without delivering any of the commodities, and the machine cannot be again worked until the spring 222 has been returned to its normal position. A tooth-rack 224 is secured to the inner face of the coin-chute-supporting plate 76, and a pawl 225 is pivotally connected to the lever 149 in position to engage the rack 224, the operation of said pawl being controlled by a spring 226, rigidly secured to the lever 149. The free end of said spring is provided with a hump 227, which engages the lower end of the pawl. When the lever 149 is in its normal position, the lower end of the pawl 225 engages the spring 226 behind the hump 227, thus holding the point of the pawl yieldingly in engagement with the rack 224. When the lever 149 is depressed to the lower end of the rack 224, a throw-off lug 228 will engage the point of the pawl and move the lower end of the pawl over the hump 227, thus holding the pawl out of engagement with the rack and allowing the lever 149 to swing upwardly, and when said lever swings upwardly to the upper end of the rack 224, the throw-on lug 229 engages the point of the pawl and swings the lower end of the pawl back over the hump 227 to its normal position. When the lever 149 has started downwardly, it cannot be returned to its normal position without completing its down course and throwing the pawl out of engagement with the rack. In other words, the machine will not be operated except by moving the lever 149 to its lowest limit. The plunger 230 is mounted to slide horizontally in the plunger-frame 231, said frame being secured to the opposite side of the main frame 51 from the counter-chute by screws inserted through the openings 232 into the main frame. The delivery-slide-unlatching pivot-bar 233 is mounted with one end in the bracket 234, extending from the brace 200, and with the other end in the bracket 235, attached to the opposite side of the frame 51.

A lug 236 extends from the bar 233 in position to engage the stop 237, extending from the bracket 235, to limit the pivotal motion of the bar 233. A series of arms 238 extend downwardly from the bar 233, and connecting-rods 239 are hooked through the arms 73 and slide through the lower ends of the arms 238, there being heads 240 upon the ends of said connecting-rods to hold the rods in the arms 238. An arm 241 extends upwardly from the bar 233 in position to be engaged by the plunger 230, so that as the plunger moves backwardly the bar 233 is tipped on its pivot to swing the arms 238 forwardly, thus pulling on the rods 239 and raising the latching-dogs 66 out of engagement with the delivery-slide, thereby releasing the slides to deliver the commodities from the tubes.

A retractile coil-spring 242 connects the arm 243, extending upwardly from the plunger 230 to the frame, the tension of said spring being exerted to snap the plunger backwardly.

The plunger-operating arm 244 extends laterally from the rear end of the plunger in position to be engaged by the vertical connecting-rod 188, so that when the lever 149 is depressed and the clutch member 160 operated the plunger is moved forwardly against the tension of the spring 242. The plunger-locking arm 245 extends downwardly from the operating-arm 244 and the locking-tooth 246 projects laterally from the lower end of this arm. The locking-pawl 247 is pivotally connected to the frame and rests upon the tooth 246, there being a shoulder 248 upon the lower side of the pawl 247 to engage and interlock with the tooth 246, so that when the plunger is pushed forward to the limit the tooth 246 engages the shoulder 248 and holds the plunger in its forward position. The plunger-unlocking dog 249 is fixed upon the shaft 212 of the clock mechanism in position to engage the free end of the pawl 247, so that as the shaft 212 rotates the free end of the pawl 247 is elevated to unlock the plunger and allow it to snap backwardly.

A wheel 250 is fixed upon the shaft 179, and teeth 251 project from the periphery of said wheel, said teeth being pointed and spaced evenly apart. A roller 252, carried by the plunger 230, engages between the teeth 251 when the plunger snaps backwardly, said roller being withdrawn out of engagement with the teeth when the plunger is moved forwardly.

Arms 253 extend radially from the wheel 250, and the indicator-rim 254 is carried by the outer ends of said arms, the outer face of said rim being divided into spaces 255, upon which any desired matter may be printed or shown, each of said spaces being of a size suitable to be seen through the glass-covered opening 256 in the upper front part of the casing.

A lever 257 is pivotally connected to the frame in a substantially vertical position, with its lower end in position to be engaged by the operating-arm 244 when it moves forwardly.

A wire 258 slides through the upper end of the lever 257 and is connected to the swinging coin-chute jaw 113, there being a head 250 to limit the distance between the jaw and the lever, so that when the plunger moves forwardly to release the indicator-wheel the jaw will swing over the mouth of the coin-chute and so that when the clutch mechanism snaps back to its normal position the jaw is left in its closed position by the sliding of the wire.

The swinging coin-chute jaw 113 will always be in its closed position when the coin-chutes are in alinement.

Coin-openings 260 lead through the casing-front 44 to the mouth of the coin-chute, and when the swinging jaw passes over the mouth of the coin-chute the coins inserted through these coin-openings will strike the swinging jaw and not pass into the coin-chute.

The goods contained in the commodity-receptacles may be indicated in the spaces 261. The commodity receptacles and slides must be constructed with reference to the goods or commodities to be vended.

Directions for operating the machine may be displayed in the space 262. A warning to those who would tamper with the machine may be displayed in the space 263, and a name-plate may occupy the space 264.

The foregoing description may be summed up in terms as follows: A plurality of commodity-receptacles are adapted to receive the goods or commodity to be vended. A paying-out mechanism is provided for each receptacle, and locking-dogs hold the paying-out mechanisms from being discharged. A clutch mechanism is adapted to discharge all of the unlocked paying-out mechanism simultaneously. The main operating-lever has mechanism to prevent its making less than a full stroke. There is a lower rigid coin-chute and an upper pivoted coin-chute, there being a coin-passage through the coin-chutes for each paying-out mechanism. A mechanism controlled from each of the upper coin-chutes connects the operating-lever to the clutch mechanism. A mechanism controlled from each of the lower coin-chutes unlocks the paying-out mechanism. The indicator-wheel is mounted to spin, and the pawl-and-ratchet connection between the indicator and the clutch mechanism provides a means of spinning the indicator in one direction. The plunger for stopping the wheel is spring-actuated to snap against the wheel, and the plunger is moved against the spring and locked by the clutch. The clock mechanism unlocks the plunger and allows it to snap. The clutch mechanism closes the swinging jaw by one connection and the operating-lever closes the swinging jaw by another connection, the latter connection being yielding, so that an obstruction to the jaw puts the machine out of order. The clock mechanism holds the upper coin-chute out of alinement with the lower coin-chute. A spring holds the swinging jaw normally open. Connections with the clutch mechanism releases the coin after it has done its work.

When the machine is in order and proper coins are used, the operation is as follows: The delivery-slides are locked, the clutch is disconnected from the operating-lever, and all the parts are in their normal positions. A coin is inserted through a coin-opening 260, which indicates the commodity desired. The coin passes into the upper coin-chute and strikes the fingers 124 and by the force of gravity operates the train of mechanism which moves the clutch-dog 161 and connects the clutch mechanism to the operating-lever. The operating-lever is depressed, thereby transferring the pressure of the delivery-slides from the locking-dogs to the latches, winding the clock mechanism, locking the plunger, operating the pawl-and-ratchet connection of the indicator-wheel, swinging the upper coin-chute into alinement with the lower coin-chute, operating the swinging jaw to close the coin-chute mouth, releasing the coin from the upper coin-chute and allowing it to pass into the lower coin-chute, where it strikes the lever 205 and raises the locking-dog 70. Then the operating-lever is released, allowing the clutch mechanism to snap back to its normal position, thus discharging the unlocked paying-out mechanism, spinning the indicator-wheel, releasing the clock mechanism, discharging the previous coins from the coin-detector, and releasing the coin from the lower chute into the coin-detector. Then the clock mechanism in due time unlocks the plunger to stop the indicator and swings the upper coin-chute to its normal position and opens its mouth. If the coin is too small, it will pass between the fingers 124 and fall into the coin-detector without throwing in the clutch.

In a companion application on coin-exhibitors for vending-machines, filed April 25, 1904, Serial No. 204,891, I claimed the coin-exhibitor by itself, and I do not wish to make such claims in this application.

I claim—

1. In a vending-machine: a lower coin-chute rigidly mounted; an upper coin-chute pivotally mounted to swing into and out of alinement with the lower coin-chute, so as to discharge either from the lower coin-chute or by the lower coin-chute; and a pivoted jaw in position to close the upper coin-chute when said upper coin-chute is in alinement with the lower coin-chute; substantially as specified.

2. In a vending-machine, a suitable casing; a lower channel-bar; an upper channel-bar; a supporting-frame slidingly mounted in said channel-bars; a third leg to support said frame when removed from the casing; and a coin-operated vending mechanism mounted upon said frame.

3. In a vending-machine: a commodity-receptacle; a slide to pay out from the receptacle; a coin-chute; a jaw pivotally mounted in position to close the coin-chute; suitable operating mechanism; and a yielding connection between the operating mechanism and the pivoted jaw, so that an obstruction interfering with the pivoted jaw will break the connection between the pivoted jaw and the operating mechanism and put the machine out of order; substantially as specified.

4. In a vending-machine, a commodity-receptacle; a slide to pay out from the receptacle; a spring to operate said slide; a locking-dog to hold the slide against the spring; a latching-dog; means of transferring the pressure from the locking-dog to the latching-dog; and coin-operated mechanism for moving the locking-dog out of the way and releasing the latching-dog.

5. In a vending-machine, a commodity-receptacle; a slide to pay out from the receptacle; a spring to operate the slide; a locking-dog to hold the slide against the spring; a latching-dog; means of transferring the pressure from the locking-dog to the latching-dog; a coin-gravity-operated lever for raising the locking-dog out of the way of the slide; and means of releasing said latch to allow the slide to snap back and pay out a commodity.

6. In a vending-machine, a support; a stud extending laterally from the support; a clutch member pivotally mounted upon the support; a commodity-receptacle; a connection between the clutch member and the commodity-receptacle for paying out the commodity; a second clutch member mounted beside the first; a main operating-lever connected to the second clutch member; a clutch-dog for connecting the second clutch member to the first clutch member; and a coin-operated lever for throwing in the clutch-dog.

7. In a vending-machine, a plurality of commodity-receptacles; a paying-out mechanism for each commodity-receptacle; a locking-dog for each commodity-receptacle; coin-operated levers for unlocking the locking-dogs; a single clutch mechanism for operating all the unlocked paying-out mechanisms simultaneously; a main operating-lever; and coin-operated means of connecting the lever to the clutch mechanism.

8. In a vending-machine, a commodity-receptacle; paying-out mechanism for the commodity-receptacle; a locking-dog for the paying-out mechanism; coin-operated means of unlocking the paying-out mechanism; a clutch mechanism for operating the paying-out mechanism, and coin-operated means of connecting the clutch mechanism.

9. In a vending-machine, a commodity-receptacle; paying-out mechanism for the commodity-receptacle; a locking-dog for the paying-out mechanism; coin-operated means of unlocking the paying-out mechanism; a clutch mechanism for operating the paying-out mechanism; coin-operated means of connecting the clutch mechanism; an indicator-wheel mounted to spin; and a pawl-and-ratchet connection between the clutch mechanism and the indicator-wheel.

10. In a vending-machine: a commodity-receptacle; a slide to pay out from the receptacle; a spring to operate said slide; a locking-dog to hold the slide against the spring; a latching-dog; means of transferring the pressure from the locking-dog to the latching-dog; a coin-operated mechanism for moving the locking-dog out of the way and releasing the latching-dog; a coin-chute for the coin-operated mechanism; a pivoted jaw in position to close the coin-chute; an operating-handle; and a yielding connection between the pivoted jaw and the operating-handle, so that an obstruction to the pivoted jaw will break the connection and put the machine out of order; substantially as specified.

11. In a vending-machine: a commodity-receptacle; a slide to pay out from the receptacle; a spring to operate the slide; a locking-dog to hold the slide against the spring; a latching-dog; means of transferring the pressure from the locking-dog to the latching-dog; a coin-gravity-operated lever for raising the locking-dog out of the way of the slide; means of releasing said latch to allow the slide to snap back and pay out a commodity; a coin-chute for the coin-operated mechanism; a pivoted jaw for closing the coin-chute; an operating-lever; and a yielding connection between the operating-lever and the pivoted jaw, so that an obstruction to the pivoted jaw will break the connection and put the machine out of order; substantially as specified.

12. In a vending-machine; a plurality of commodity-receptacles; a plurality of independent slides to pay out one from each receptacle; a spring to operate each slide independently; a locking-dog to hold each slide against its spring; a latching-dog for each slide; independent means of transferring the pressure from each locking-dog to the corresponding latching-dog; a coin-chute having a coin-passage for each commodity-receptacle; and coin-operated mechanism independently connecting each coin-passage to the corresponding locking-dog for moving the locking-dog out of the way and releasing the corresponding latching-dog, so that the delivery may be made from two or more of the commodity-receptacles simultaneously by inserting the desired number of coins into the desired coin-passages; substantially as specified.

13. In a vending-machine: a plurality of commodity-receptacles; slides to pay out from the receptacles; springs to operate the slides; locking-dogs to hold the slides against the springs; latching-dogs; means of transferring the pressure from the locking-dogs to the latching-dogs; coin-gravity-operated levers for raising the locking-dogs out of the way of the slides; independent means for releasing each latch to allow its slide to snap back and pay out a commodity; a coin-chute having a plurality of coin-passages, one for each commodity-receptacle; said coin-gravity-operated levers being in position to be operated by coins passing through said passages; an operating-lever; and clutch mechanism connecting the operating-lever to the pay-out mechanism of the commodity-receptacle, so that any desired number of commodity-receptacles will pay out simultaneously; substantially as specified.

14. In a vending-machine: a support; a stud extending laterally from the support; a clutch member pivotally mounted upon the support; a commodity-receptacle; a connection between the clutch member and the commodity-receptacle for paying out the commodity; a second clutch member mounted beside the first; a main operating-lever connected to the second clutch member; a clutch-dog for connecting the second clutch member to the first clutch member; a coin-operated lever for throwing in the clutch-dog; a coin-chute; a pivoted jaw in position to close the coin-chute; and a yielding connection between the pivoted jaw and the main operating-lever, so that an obstruction to the pivoted jaw will break the connection and put the machine out of order; substantially as specified.

15. In a vending-machine, a commodity-receptacle; paying-out mechanism for the commodity-receptacle; a locking-dog for the paying-out mechanism; coin-operated means of unlocking the paying-out mechanism; a clutch mechanism for operating the paying-out mechanism; coin-operated means of connecting the clutch mechanism; an indicator-wheel mounted to spin; and a pawl-and-ratchet connection between the clutch mechanism and the indicator-wheel; a spring-actuated plunger for stopping the wheel; means of moving the plunger against the spring and locking the plunger; a clock mechanism for unlocking the plunger; and coin-operated means of controlling the clock.

16. In a vending-machine, a plurality of commodity-receptacles; a paying-out mechanism for each receptacle; a locking-dog for each paying-out mechanism; a single clutch mechanism for operating all the unlocked paying-out mechanisms simultaneously; a main operating-lever; a coin-chute having a coin-passage for each commodity-receptacle; a connection between the coin-chute passages and the locking-dogs for unlocking the paying-out mechanism; and a single connection between all the coin-chute passages and the clutch mechanism; so that the passage of proper coins through the coin-chute will unlock corresponding paying-out mechanisms and connect the operating-lever to the clutch mechanism.

17. In a vending-machine, a plurality of commodity-receptacles; a paying-out mechanism for each receptacle; a locking-dog for each paying-out mechanism; a clutch mechanism for operating all the unlocked paying-out mechanisms simultaneously; a main operating-lever; a lower coin-chute rigidly mounted and having a coin-passage for each paying-out mechanism; an upper coin-chute pivotally mounted and having corresponding coin-passages normally out of alinement with the lower passages; a connection between all the upper coin-passages and the clutch mechanism for connecting the operating-lever to the clutch mechanism; a connection between the clutch mechanism and the upper coin-chute for moving the upper and lower coin-chute passages into alinement; and connections between the lower coin-chute passages and the locking-dogs so that each coin in passing through the lower coin-chute will unlock a corresponding paying-out mechanism.

18. In a vending-machine: a commodity-receptacle; paying-out mechanism for the commodity-receptacle; a locking-dog for the paying-out mechanism; coin-operated means of unlocking the paying-out mechanism; a clutch mechanism for operating the paying-out mechanism; coin-operated means of connecting the clutch mechanism; an indicator-wheel mounted to spin; and a pawl-and-ratchet connection between the clutch mechanism and the indicator-wheel; a spring-actuated plunger for stopping the wheel; means of moving the plunger against the spring and locking the plunger; a clock mechanism for unlocking the plunger; coin-operated means of controlling the clock; a pivoted jaw in position to close the coin-chute; and a yielding connection between the pivoted jaw and the operating mechanism, so that an obstruction to the pivoted jaw will break the connection and put the machine out of order; substantially as specified.

19. In a vending-machine: a plurality of commodity-receptacles; a paying-out mechanism for each receptacle; a locking-dog for each paying-out mechanism; a single clutch mechanism for operating all the unlocked paying-out mechanisms simultaneously; a main operating-lever; a coin-chute having a coin-passage for each commodity-receptacle; a connection between the coin-chute passages and the locking-dogs for unlocking the paying-out mechanism; a single connection between all the coin-chute passages and the clutch mechanism, so that the passage of proper coins through the coin-chute will unlock corresponding paying-out mechanisms and connect the operating-lever to the clutch mechanism; a pivoted jaw in position to close the coin-chute; and a yielding connection between the pivoted jaw and the operating mechanism; so that an obstruction to the pivoted jaw will break the connection and put the machine out of order; substantially as specified.

20. In a vending-machine; a plurality of commodity-receptacles; a paying-out mechanism for each receptacle; a locking-dog for each paying-out mechanism; a clutch mechanism for operating all the unlocked paying-out mechanisms simultaneously; a main operating-lever; a lower coin-chute rigidly mounted and having a coin-passage for each paying-out mechanism; an upper coin-chute pivotally mounted and having corresponding coin-passages normally out of alinement with the lower passages; a connection between all the upper coin-passages and the clutch mechanism for connecting the operating-lever to the clutch mechanism; a connection between the clutch mechanism and the upper coin-chute for moving the upper and lower coin-chute passages into alinement; connections between the lower coin-chute passages and the locking-dogs so that each coin in passing through the lower coin-chute will unlock a corresponding paying-out mechanism; a pivoted jaw in position to close the coin-chute; and a yielding connection between the pivoted jaw and the operating mechanism, so that an obstruction to the pivoted jaw will break the connection and put the machine out of order; substantially as as specified.

In testimony whereof I have signed my name to this specification in presence of two subscribing witnesses.

GUSTAV F. HOCHRIEM.

Witnesses:
M. G. IRION,
ALFRED A. EICKS.